Aug. 29, 1961 D. A. HAMILTON ET AL 2,998,050
ASSEMBLY MACHINE
Filed June 22, 1959 12 Sheets-Sheet 7

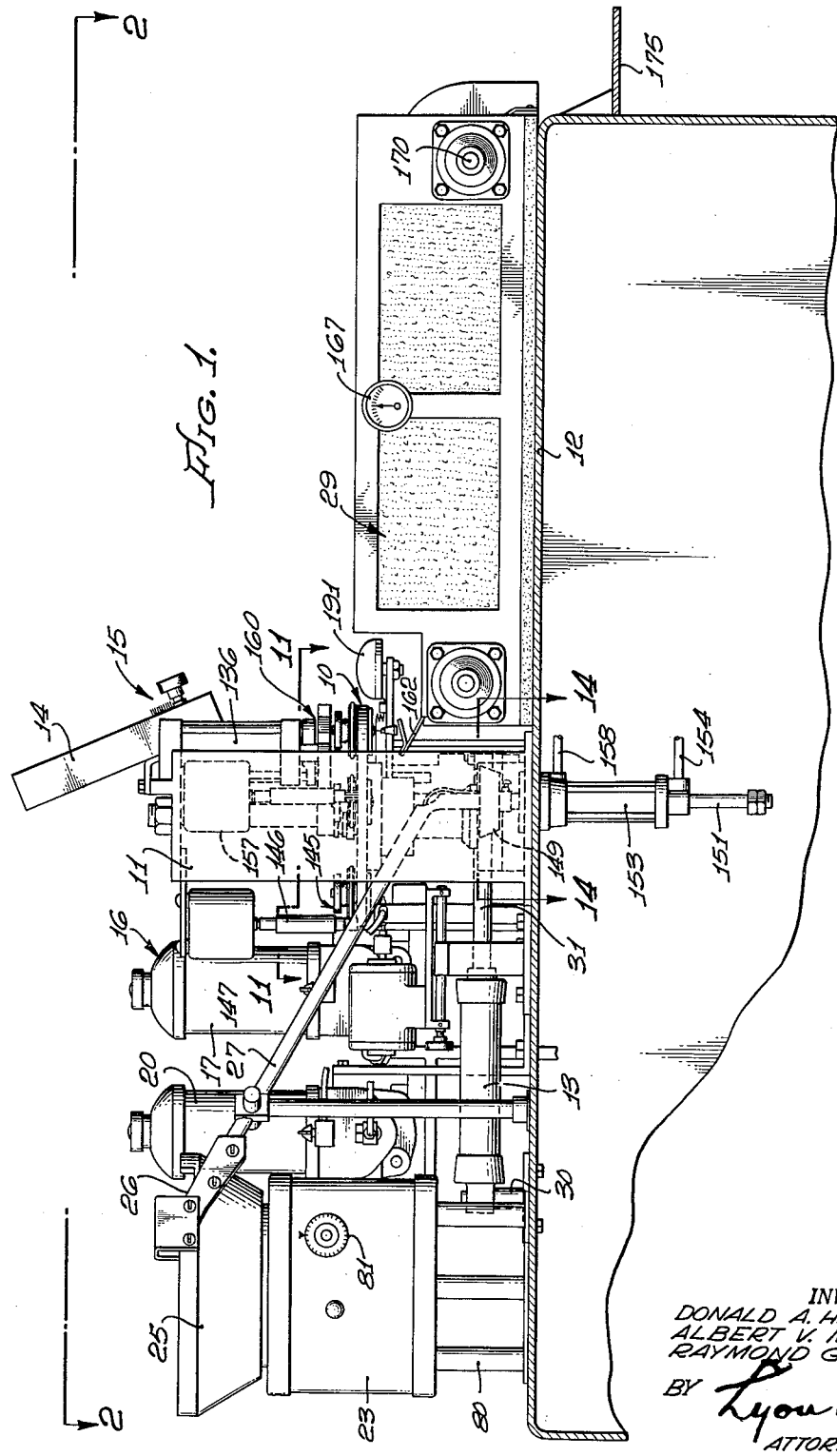

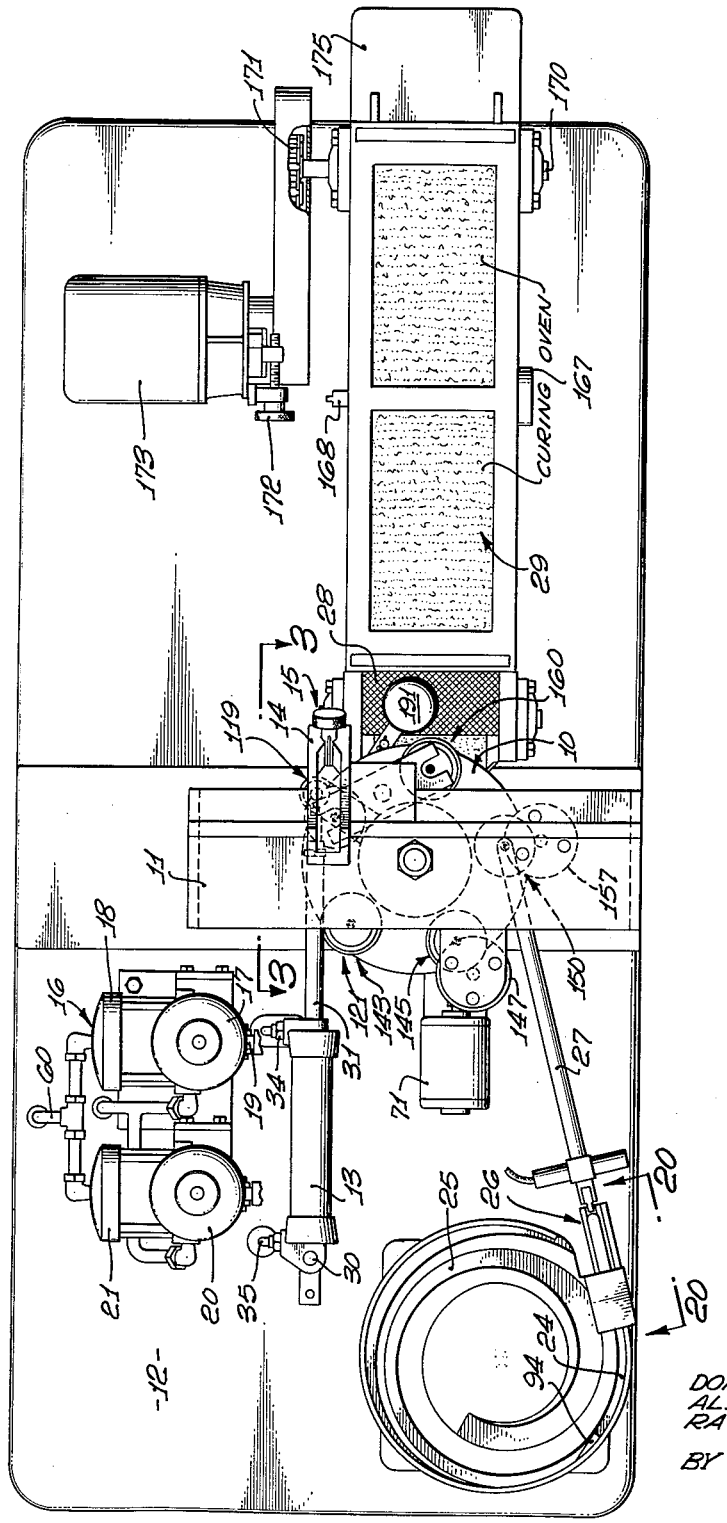

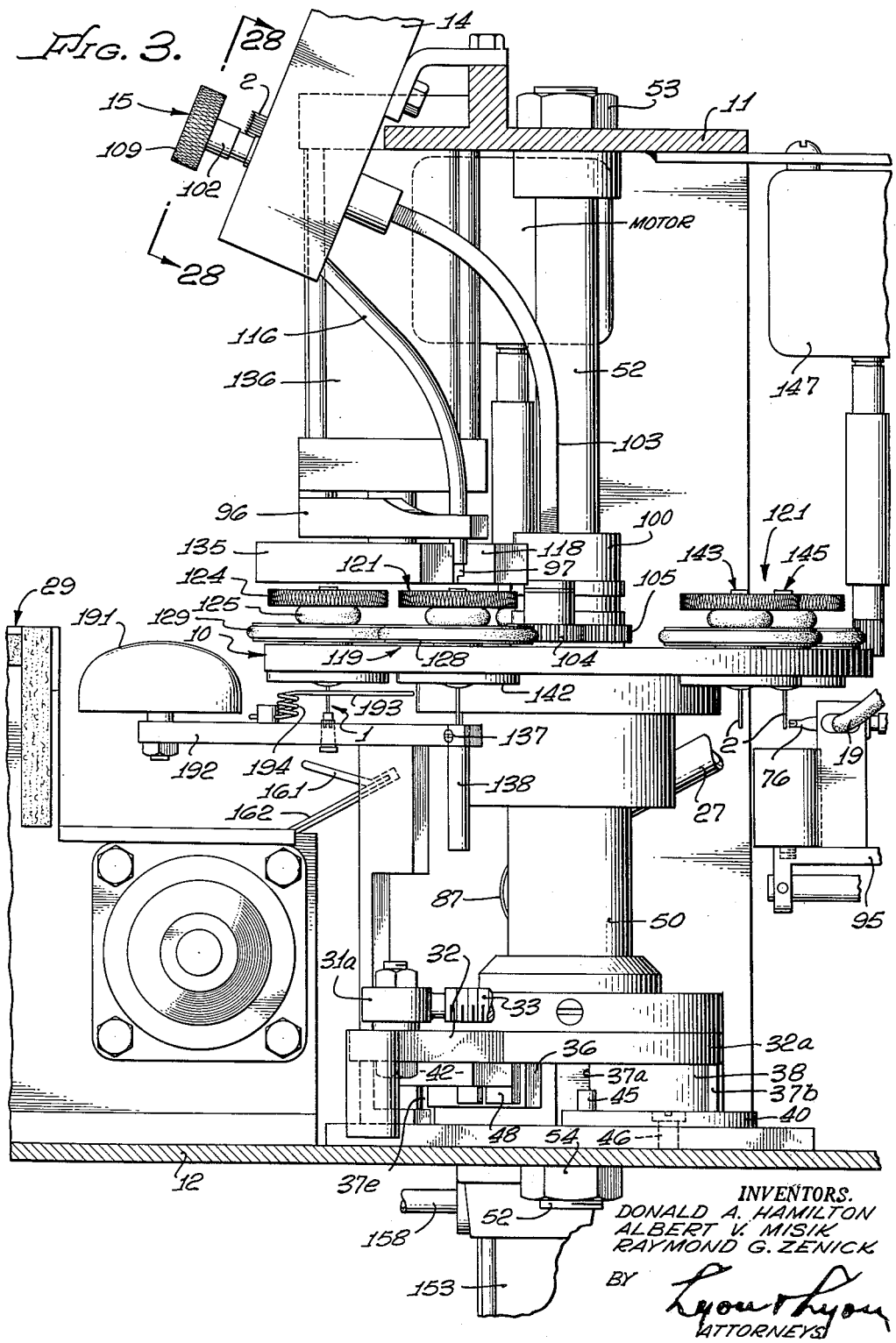

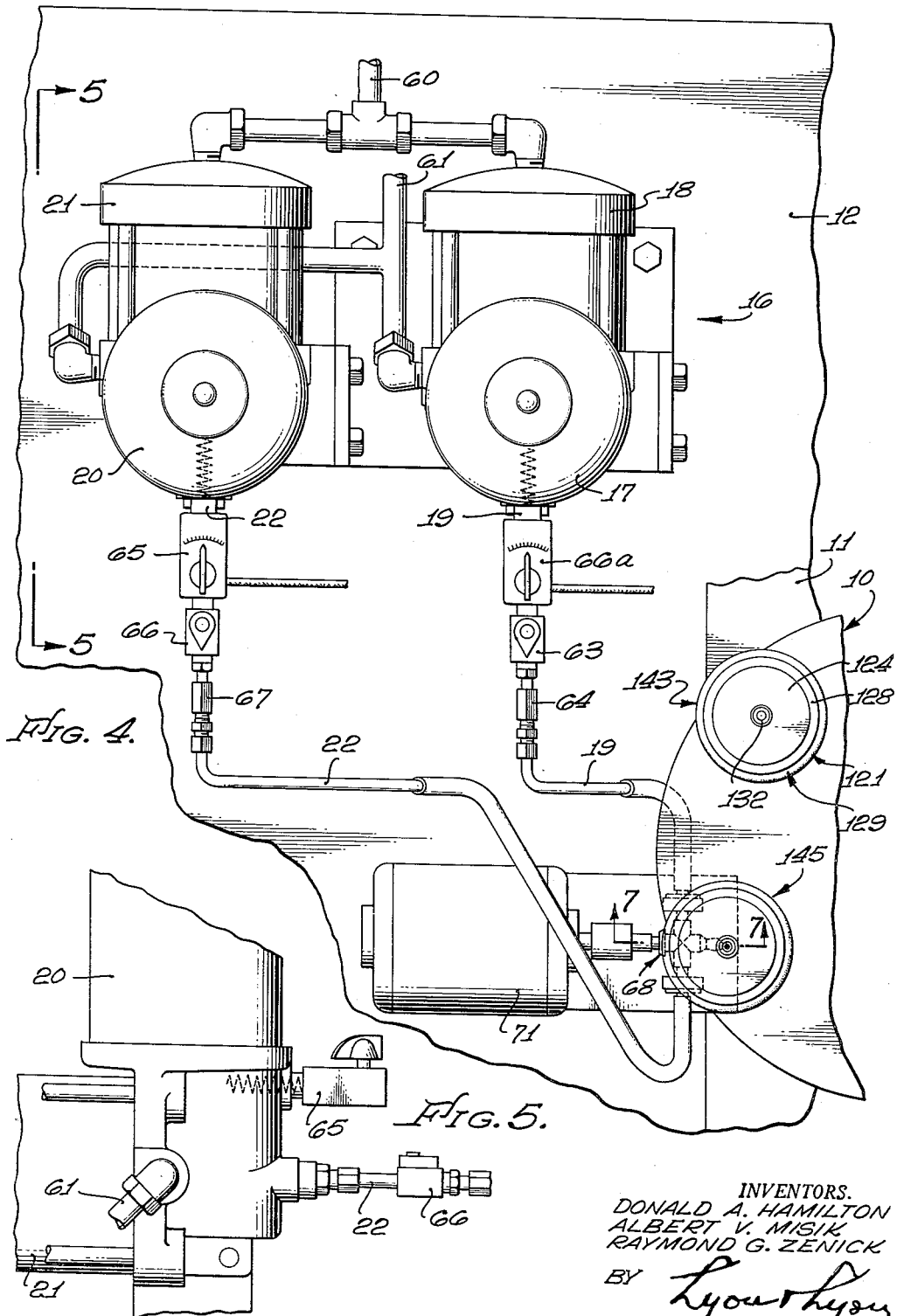

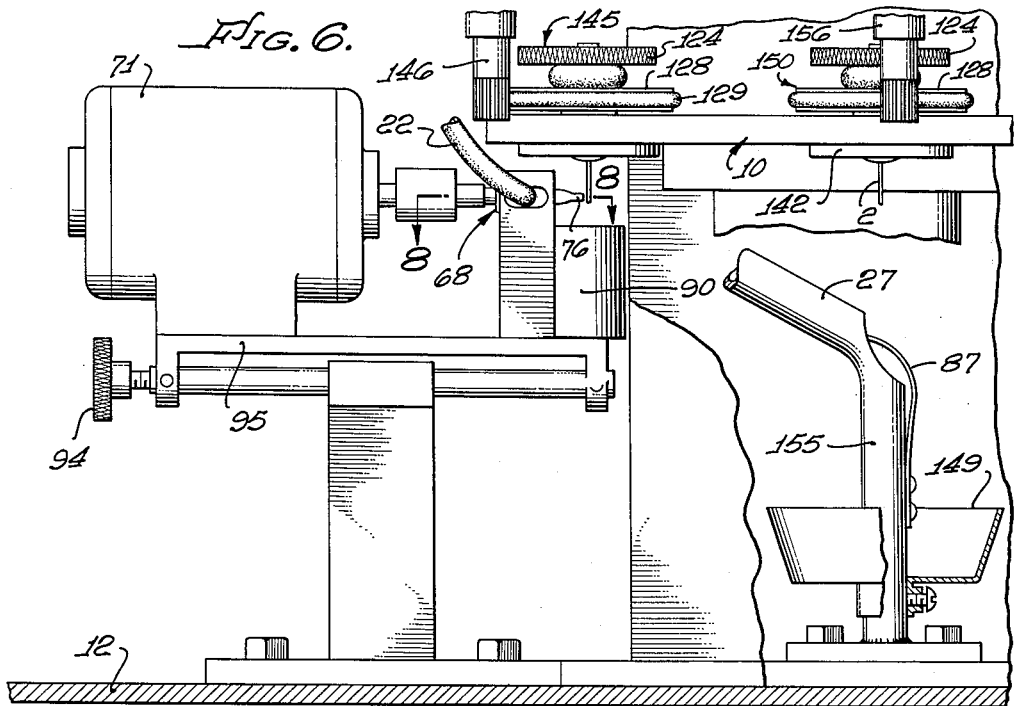
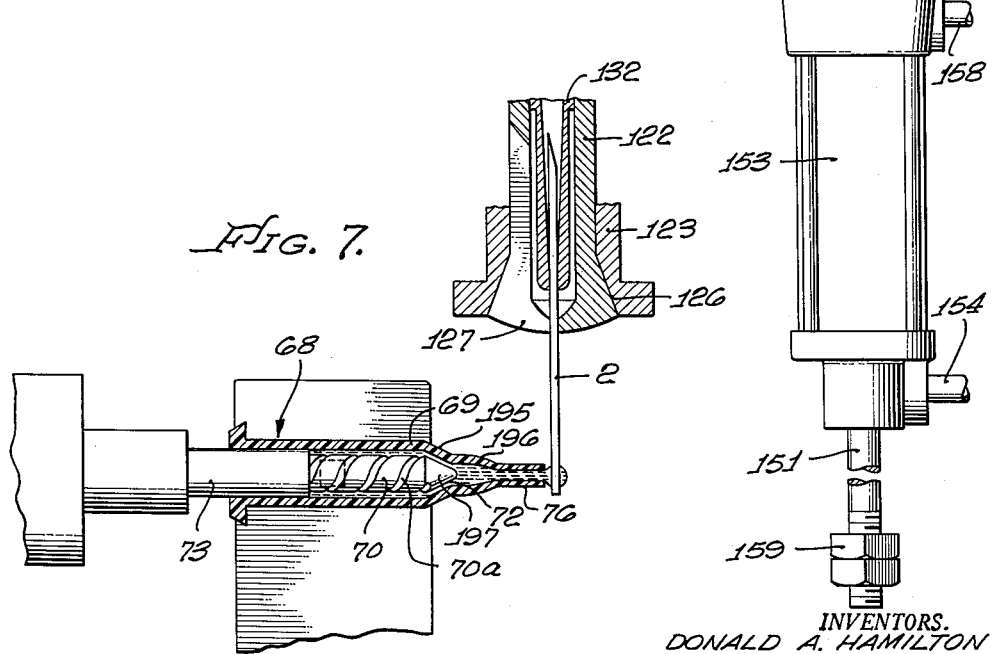

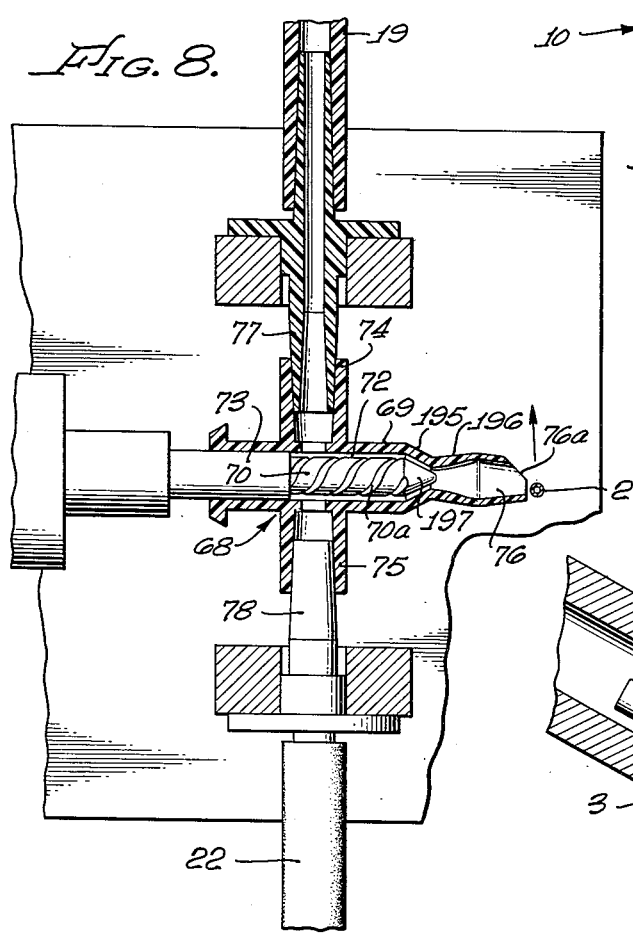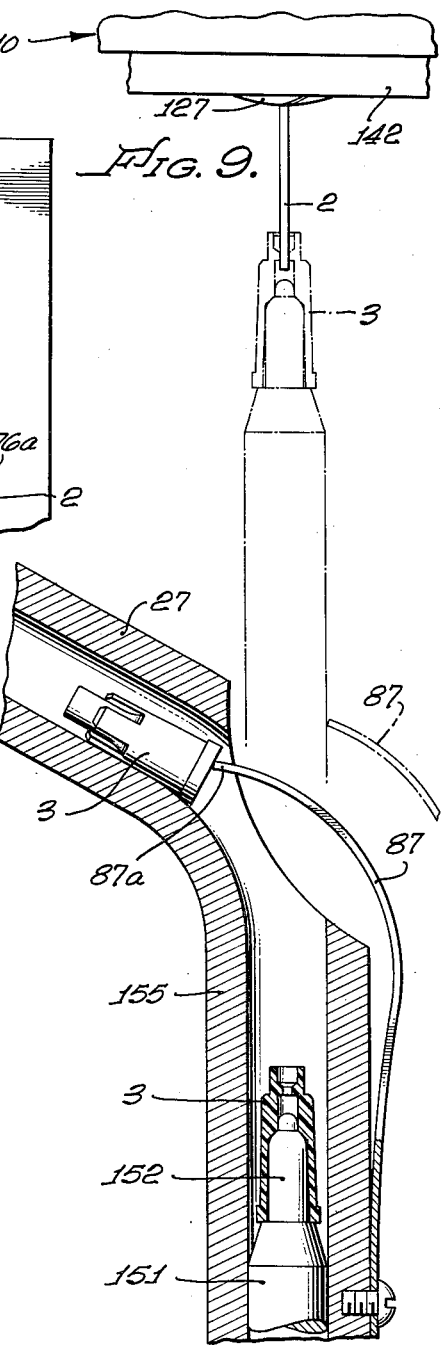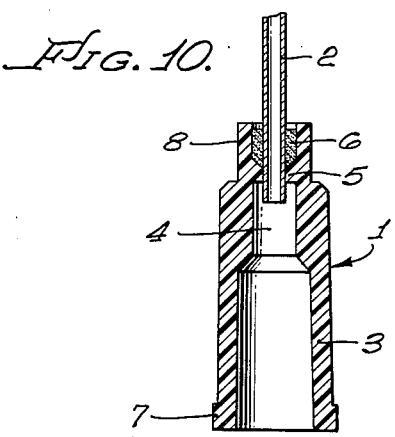

INVENTORS.
DONALD A. HAMILTON
ALBERT V. MISIK
RAYMOND G. ZENICK
BY
ATTORNEYS.

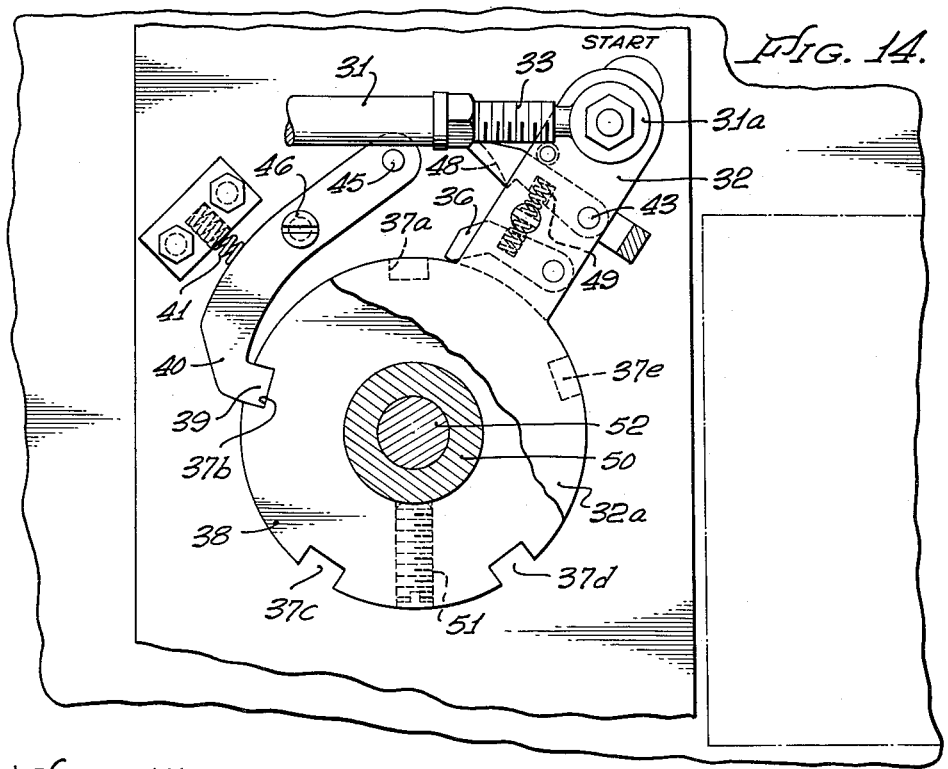
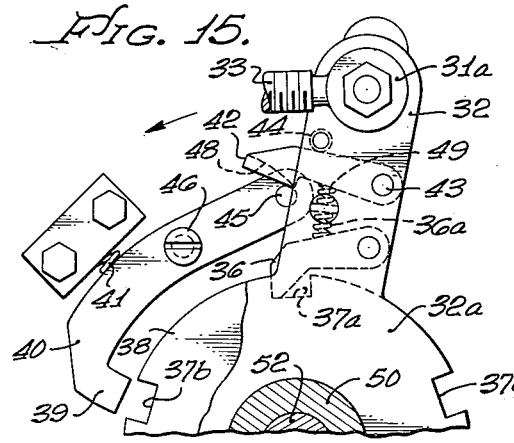
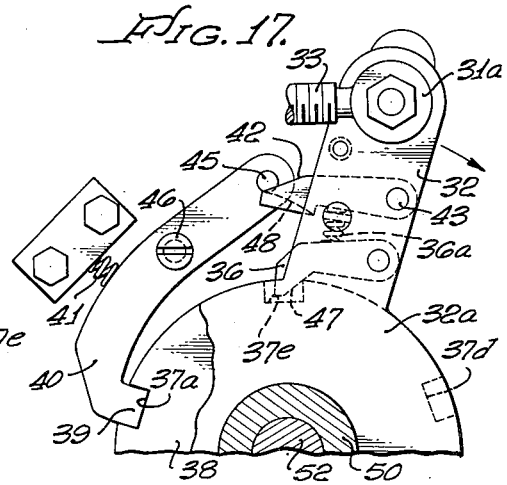
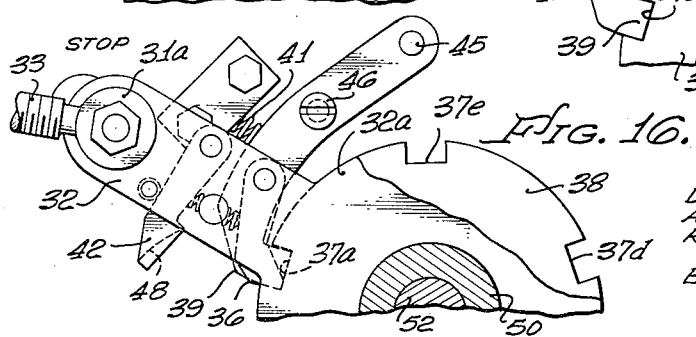

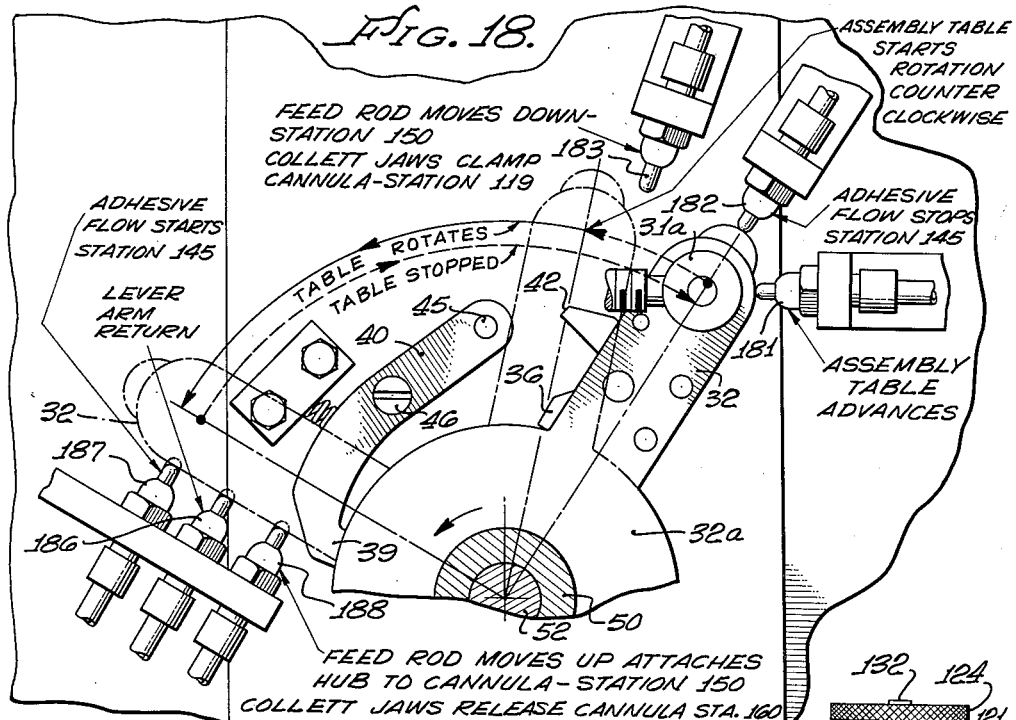
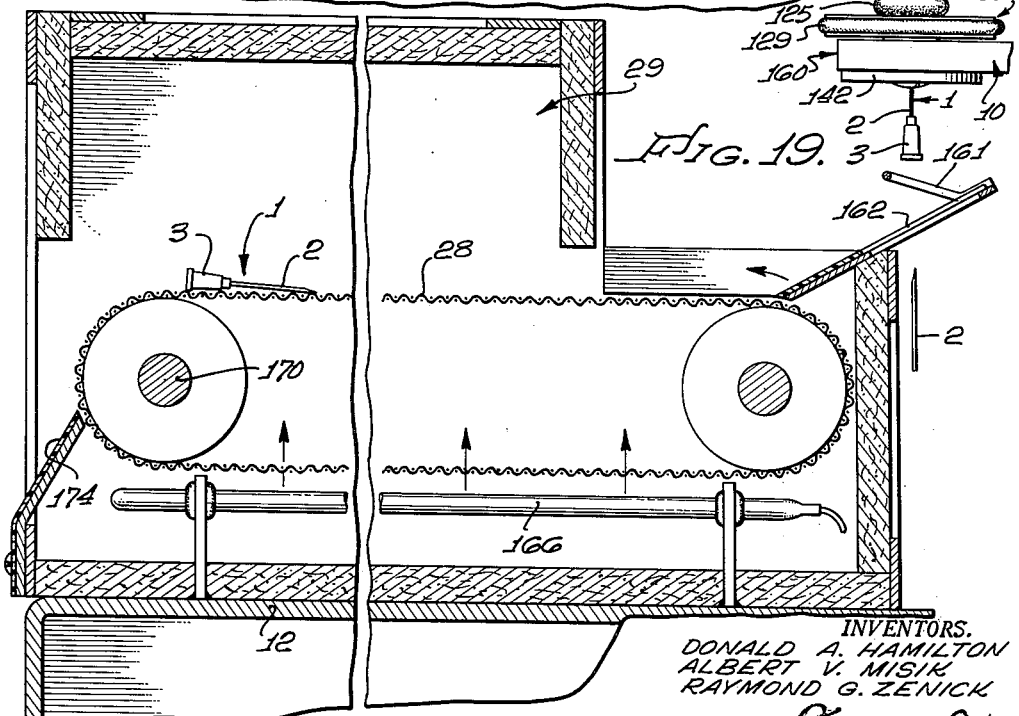

Aug. 29, 1961     D. A. HAMILTON ET AL     2,998,050
ASSEMBLY MACHINE
Filed June 22, 1959     12 Sheets-Sheet 10
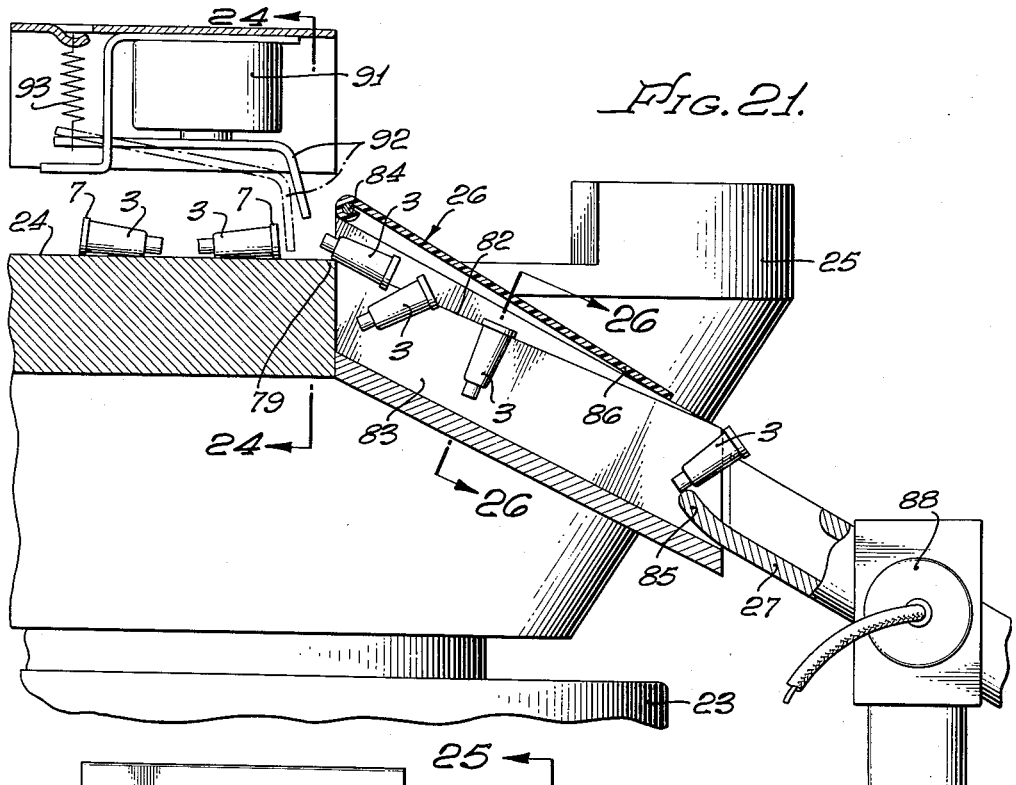
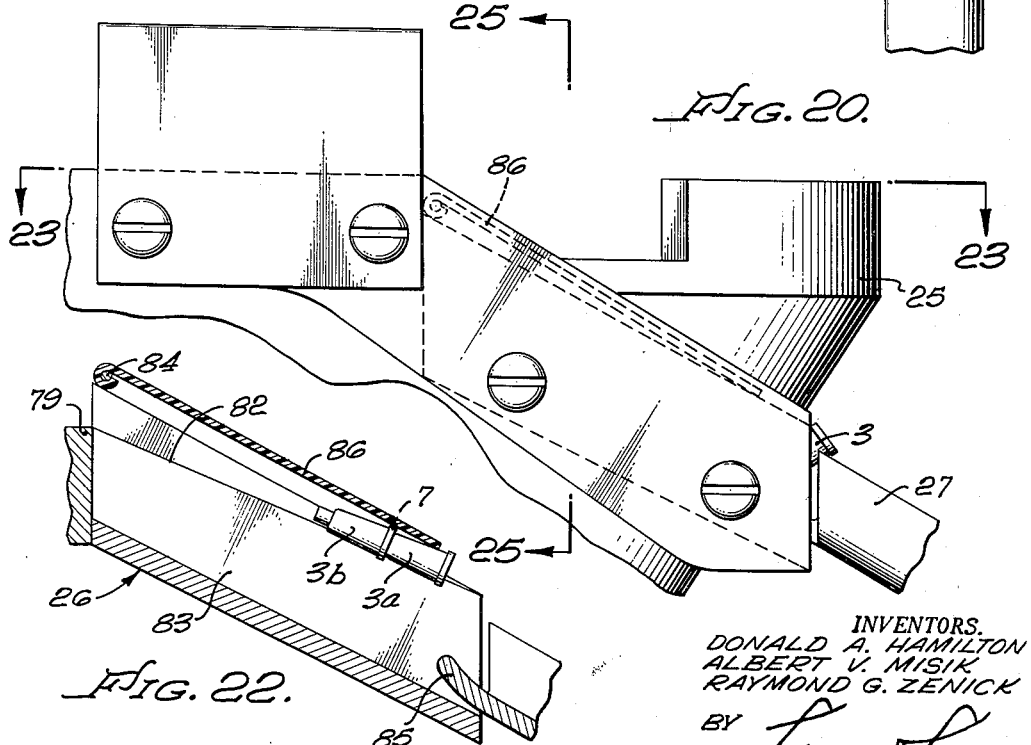

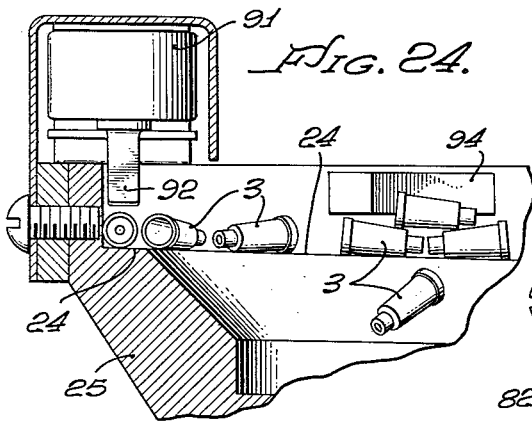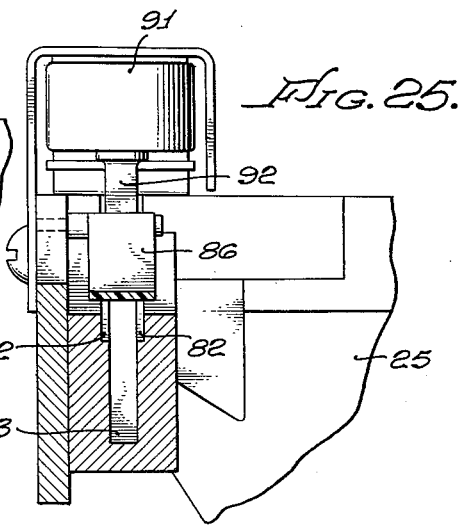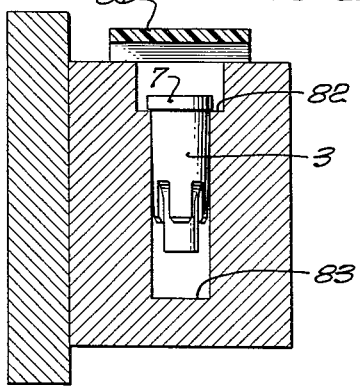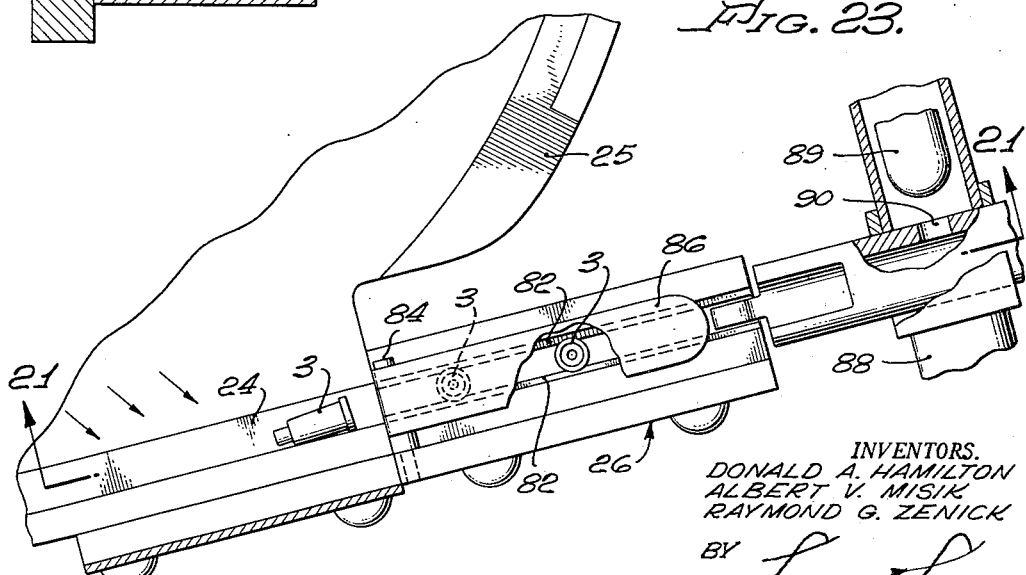

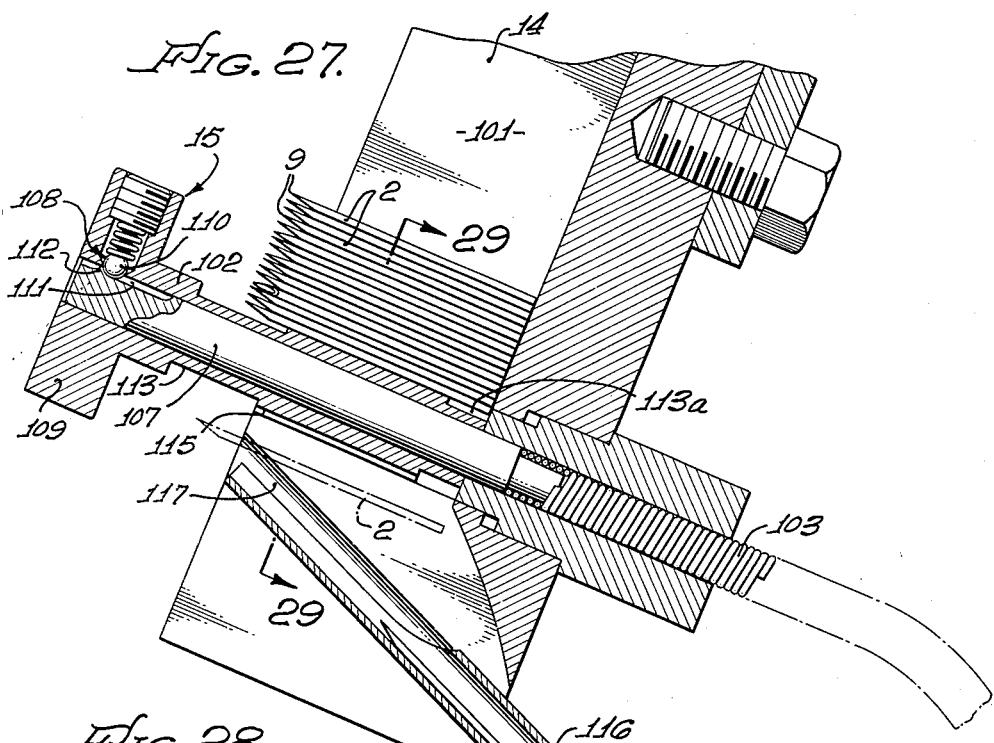
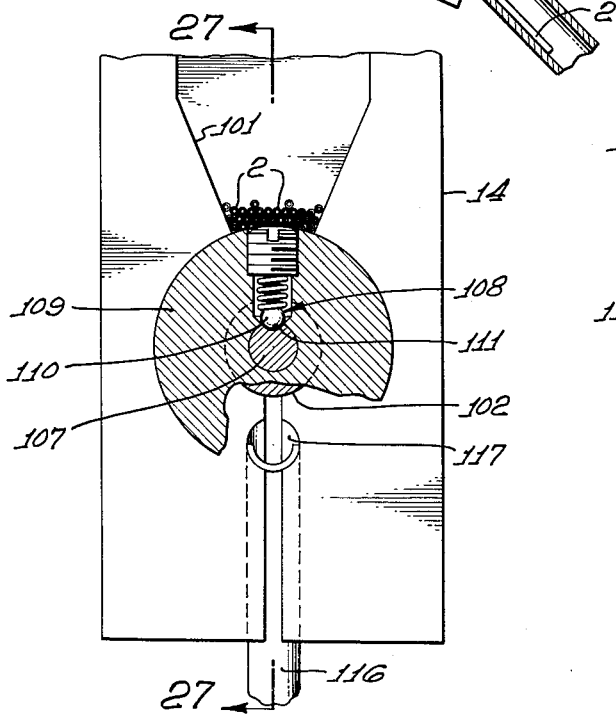
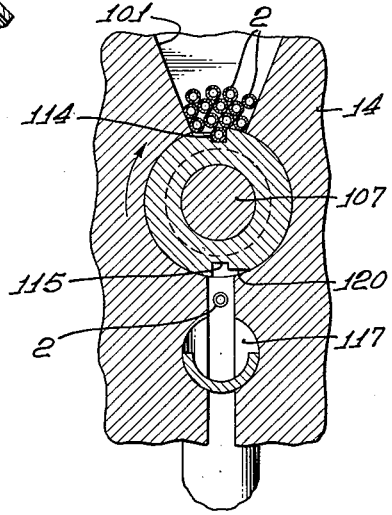

United States Patent Office 2,998,050
Patented Aug. 29, 1961

2,998,050
ASSEMBLY MACHINE
Donald A. Hamilton, Burbank, Albert V. Misik, Los Angeles, and Raymond G. Zenick, Glendale, Calif., assignors to Don Baxter, Inc., Glendale, Calif., a corporation of Nevada
Filed June 22, 1959, Ser. No. 821,757
21 Claims. (Cl. 154—1.6)

This invention relates to an automatic machine for assembling hypodermic needles, and more particularly to a machine for attaching plastic hubs to metal needle cannulas.

Ordinary hypodermic needles are expensive, and are normally reused many times. Before each use the needle must be very carefully cleaned and sterilized. Unless extreme care is taken, infectious hepatitis and other diseases may be transmitted from one patient to another. Moreover the points of the needles are delicate and must be frequently sharpened to remove burrs, shovel-nosed points, fishhooks, and dull edges. It is therefore desirable to have an inexpensive hypodermic needle which can be discarded after a single use. The machine of this invention automatically assembles such needles, thereby reducing their manufacturing cost.

An object of this invention is to provide a machine for assembling hypodermic needles.

Another object of the invention is to provide a needle assembly machine having a reliable device for feeding a single cannula to an assembly station.

Another object of the invention is to provide a needle assembly machine having a means for securely holding a cannula without damage during the assembly operations.

Another object is to provide a needle assembly machine having a mechanism for orienting needle hubs.

A further object is to provide a needle assembly machine having an adhesive metering, mixing, and dispensing system for automatically applying adhesive to the cannula hub joint.

A still further object of the invention is to provide a machine which assembles needles rapidly with a minimum of misses, and which has precautions and alarms to eliminate or minimize the effect of any such misses.

Other objects will become apparent from the following description of the preferred example of the invention and the accompanying drawings in which:

FIGURE 1 is a front elevation of an embodiment of this invention;

FIGURE 2 is a top view of the invention along the line 2—2 of FIGURE 1;

FIGURE 3 is a partial rear view along the line 3—3 of FIGURE 2 showing the major components of the cannula feeder;

FIGURE 4 is a partial top view showing the components of the adhesive metering and dispensing system;

FIGURE 5 is a partial left side view of the adhesive system along the line 5—5 of FIGURE 4;

FIGURE 6 is an elevation showing major components of the adhesive applying and hub attaching stations;

FIGURE 7 is a sectional view on the line 7—7 of FIGURE 4 showing details of the adhesive mixing and applying system.

FIGURE 8 is a sectional view on the line 8—8 of FIGURE 6 showing details of the adhesive mixer;

FIGURE 9 is a sectional view on the line 9—9 of FIGURE 11 showing details of the hub feeding mechanism;

FIGURE 10 is a sectional view of an assembled hypodermic needle made by the machine of this invention;

FIGURE 14 is a sectional view along the line 14—14 of FIGURE 1, partially cut away to show components of the rotary table drive at the start of its cycle;

FIGURE 15 is a view similar to FIGURE 14, but showing the relative position of the components during advancing of the rotary table;

FIGURE 16 is a view similar to FIGURE 14, but showing the relative positions of the components of the rotary table drive at the end of its advance;

FIGURE 17 is a view similar to FIGURE 14, but showing the relative positions of the components during the return movement of the driving mechanism;

FIGURE 18 is a plan view of a detail showing the air control valves;

FIGURE 19 is a sectional view showing details of the curing oven;

FIGURE 20 is a partial front elevation along the line 20—20 of FIGURE 2 showing the hub feeding unit;

FIGURE 21 is a sectional view along the line 21—21 of FIGURE 23 showing details of the hub feeding and orientation unit;

FIGURE 22 is a sectional view of the hub orientation unit when two hubs nest together, one inside the other;

FIGURE 23 is a top view along the line 23—23 of FIGURE 20 partially cut away to show details of the hub orientation unit;

FIGURE 24 is a sectional view along the line 24—24 of FIGURE 21 showing details of the hub feeding bowl;

FIGURE 25 is a sectional view along the line 25—25 of FIGURE 20 also showing details of the hub feeding bowl;

FIGURE 26 is a sectional view along the line 26—26 of FIGURE 21 showing details of the hub orientation unit;

FIGURE 27 is a sectional view along the line 27—27 of FIGURE 28;

FIGURE 28 is a sectional view along the line 28—28 of FIGURE 3 showing details of the cannula feeder;

FIGURE 29 is a sectional view along the line 29—29 of FIGURE 27 also showing details of the cannula feeder.

Figure 11:
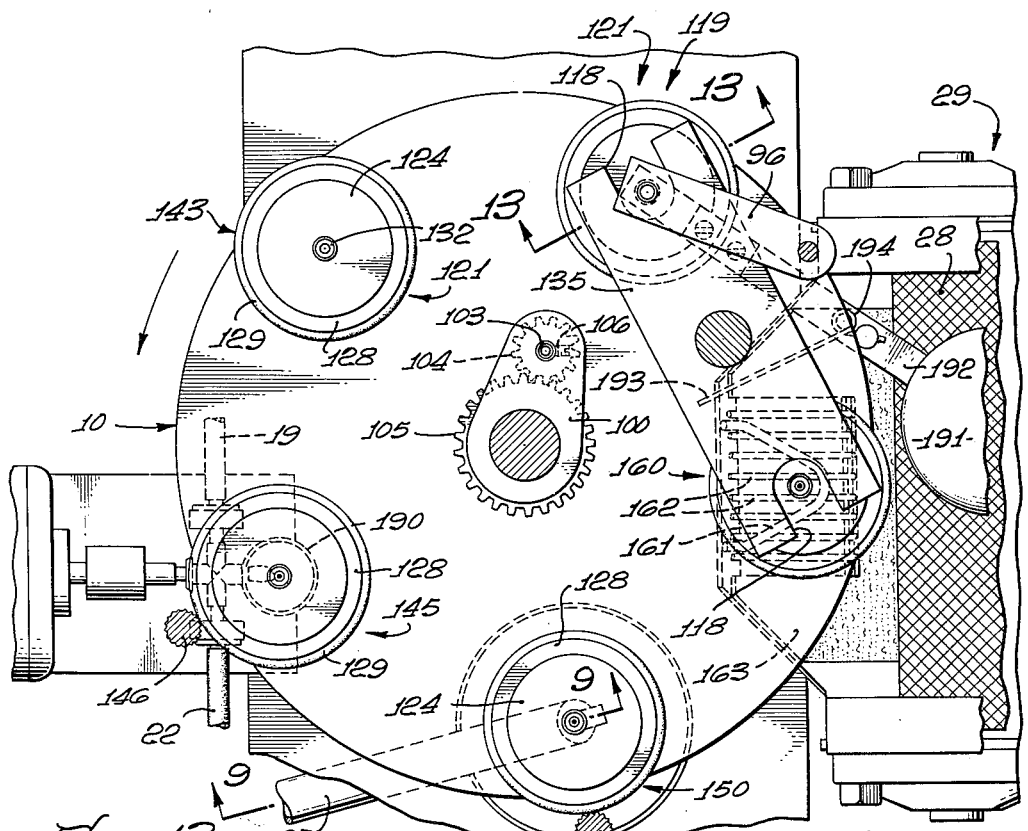
FIGURE 11 is a sectional view on the line 11—11 of FIGURE 1 showing details of the rotary assembly table.

The hypodermic needle which is assembled by the machine of the present invention is described in more detail in a co-pending patent application Serial No. 559,627, filed January 17, 1956. As shown in FIGURE 10, the needle generally indicated as 1, has a metal cannula 2 and a plastic hub 3. Near the cannula end, the bore 4 of hub 3 has an annular boss 5 fitting tightly around the base of cannula 2. Above the boss 5, an annular space containing adhesive 6 is provided between the cannula and the hub. A protector hub 8 is preferably provided at the cannula end of the hub. At the end opposite the cannula, an annular flange 7 projects out from the exterior of the hub.

FIGURES 1 and 2 show the overall arrangement of the assembly machine. Most of the assembly operations are performed by elements positioned at stations around the periphery of rotary assembly table 10, which includes cannula holders 121 for receiving and carrying the cannulas from one station to the next. Intermittent drive means rotates the assembly table 10 to move each cannula from one operative station to the next, after a suitable pause.

The rotary assembly table 10 is mounted by a frame 11 on a bench 12. The table 10 is driven intermittently by the pneumatic drive cylinder 13. Metal cannulas 2 stored in the hopper 14 are supplied to the cannula feeding station 119 of assembly table 10 by the cannula feeder, generally indicated as 15. An adhesive, preferably of the epoxy-polyamide type, is supplied to the adhesive applying station 145 by the adhesive metering, mixing, and dispensing system 16. When adhesive of the epoxy-polyamide type is used, the adhesive system 16 includes an epoxy reservoir 17, an epoxy pump 18, an epoxy supply line 19, a polyamide reservoir 20, a polyamide pump 21, and a polyamide supply line 22.

Hubs 3 are fed by the vibratory feeder 23 around a spiral track 24 of the hub bowl 25 to the orienting unit 26. Oriented hubs pass base down through the feed tube 27 to a position below the hub attaching station 150. The assembled needle 1 is dropped at the exit station 160 onto the conveyor 28 which carries it through the curing oven 29.

DETAILS OF THE ROTARY TABLE DRIVE

As shown in FIGURES 1, 2, 3 and 14, one end of the drive cylinder 13 is pivot mounted by the pin 30 to the bench 12. A drive rod 31 extends from the free end of cylinder 13 and is attached by a yoke 31a to the reciprocating lever arm 32. The other end of lever arm 32 connects with reciprocating disc 32a. The effective length of drive rod 31 can be adjusted by linkage 33. Compressed air supplied to the inlet 34 of cylinder 13 retracts the drive rod 31 and thereby advances rotary table 10. Compressed air supplied through inlet 35 extends the drive rod 31 to return the driving mechanism to the start of its cycle.

At the start of its cycle (FIGURE 14) the drive rod 31 is in a fully extended position. The driving pawl 36 is beyond notch 37a of ratchet wheel 38. A locking arm 40 is pivotally mounted at 46 and has a lug 39 on one end which is held by the spiral spring 41 in one of the notches 37b of ratchet wheel 38.

As drive rod 31 is retracted (FIGURE 15), lever arm 32 moves in a counterclockwise direction. The trip arm 42, which pivots about the pin 43, is guided by the spring 49 above the locking arm stud 45. As the counterclockwise motion continues, the trip arm 42 is forced by the stud 44 to press downwardly on locking arm stud 45, rotating the locking arm 40 about the pivot 46 and removing the lug 39 from notch 37b. Driving pawl 36 is then forced by spiral spring 36a into notch 37a, turning the ratchet wheel 38, the axle 50, and the rotary assembly table 10.

When the drive rod 31 is fully retracted (FIGURE 16), trip arm 42 is beyond the locking arm stud 45, allowing lug 39 to be urged by spring 41 into notch 37a, thus locking table 10 in position.

Drive rod 31 is then extended by admitting air to drive cylinder 13 through inlet 35 and lever arm 32 moves in a clockwise direction (FIGURE 17). The edge of notch 37a against the slanted rear surface 47 of driving pawl 36 forces the pawl out of the notch against the pressure of spring 36a. The trip arm 42 is guided by the downwardly extending cam 48 below the locking arm stud 45 so that lug 39 is not displaced from the notch.

Ratchet wheel 38 is attached to axle 50 of the assembly table by setscrew 51. The axle 50 rotates about the stationary center rod 52 which is connected by nuts 53 and 54 to the frame 11.

DETAILS OF THE ADHESIVE MIXING AND DISPENSING SYSTEM

Details of the adhesive mixing and dispensing system 16 are shown in FIGURES 4-8. As previously mentioned, the adhesive is preferably of the epoxypolyamide type. For this adhesive, separate pumps 18, 21 are provided for the epoxy and the polyamide ingredients respectively. Air for advancing the pistons enters pumps 18 and 21 through the inlet 60. Air for retracting the pistons enters through the inlet 61. The structure of the pumps is conventional and is preferably of the type used for providing automatic proportioned lubrication to certain types of machines.

The polyamide reservoir 20 has a heater 65 which increases the fluidity of the ingredient. The polyamide supply line 22 has a metering valve 66 and a check valve 67. The epoxy supply line 19 has a metering valve 63, and a check valve 64. The epoxy reservoir 17 may also be provided with a heater 66a.

Supply lines 19, 22 lead to a mixing chamber 68, preferably made of a plastic material such as nylon or Delrin, and having a body 69. At one end, the body 69 has a frusto conical section 195 tapering to a section of reduced diameter 196. A polished steel rotor 70 having a spiral groove 70a, and a conical tip 197 enters the chamber 68 at right angles to the ingredient inlets 74 and 75 and is driven in a clockwise direction by motor 71. A space 72, preferably about 10 thousandths inch thick and not more than about 30 thousandths, is provided between the walls of body 69 and rotor 70. At the entrance to chamber 68 a cylindrical boss 73 of larger diameter than rotor 70 forms a tight seal with body 69.

The end of reduced diameter section 196 terminates in an applicator tip 76 which is flattened in a horizontal direction and cut away at the corner 76a. Tapered connectors 77, 78 connect the supply lines 19, 22 to inlets 74, 75.

The adhesive system described above is particularly effective in intimately mixing the adhesive ingredients together. This is particularly difficult because only very small quantities can be mixed at a time and because the physical properties of the two ingredients are quite different. This mixing is accomplished by literally "smearing" the two ingredients together in very thin layers in the space 72. The thickness of space 72 for most efficient mixing varies with the viscosity of the adhesive ingredients, and the speed of rotor 70, but should be kept within the above stated limits. If space 72 is too large, proper mixing is not obtained. If it is too small, the adhesive overheats and tends to cure prematurely. The plastic body 69 causes relatively low heat build up with consequent curing of the adhesive, because the ingredients slide freely around the inner surface of body 69 while moving with the rotor 70.

Curing of the mixed adhesive in mixing chamber 68 is prevented by providing a flow of adhesive at least 20 percent greater than the amount actually applied to the cannulas. This extra adhesive drips off the applicator tip 76 into the adhesive overflow container 190. Adhesive is urged forward in the body 69 by the spiral groove 70a and by the pressure of ingredient pumps 18, 21. The smooth even contours of the space 72 provide a smooth, laminar flow without dead spaces in which the adhesive might cure prematurely. At the end of each run, the inexpensive plastic chamber 68 is discarded, thus providing a clean, new chamber for each run.

The particular design of the applicator tip 76 provides a uniform drop of adhesive having a relatively flat exposure to the cannula. Excess adhesive flows out of the corner 76a so that the size and shape of the adhesive drops are not unduly disturbed. This design results in a wide, thin band of adhesive applied uniformly around the cannula so that air is not trapped in the hub by the adhesive. Avoidance of such air entrapment is essential since the air expands in the oven and weakens the adhesive joint.

The described adhesive system also minimizes the effect of variables on the application of adhesive to the cannulas. For example, this system applies a relatively constant amount of adhesive to each cannula regardless of the temperature or viscosity of the adhesive ingredients, or whether or not there was a cannula in the previous cannula holder. This contributes substantially to the uniformity of the completed needles.

DETAILS OF THE HUB ORIENTING AND FEEDING MECHANISM

The vibratory feeder 23 is mounted on supports 80 and is equipped with a rheostat 81 (FIGURE 1). Hubs 3 are fed by vibration of the bowl 25 along spiral track 24. The track 24 narrows so as to accommodate only a single row of hubs in end-to-end position as it approaches the hub orienting unit 26. Excess hubs which tend to ride on top of the single row of hubs are pushed from track 24 back to the bottom of bowl 25 by diverter 94.

As shown in FIGURES 21, and 23 to 26, the hubs pass longitudinally from the spiral track 24 to the hub orienting unit 26. As hubs pass over the rise 79 they are separated, the track 82 engages the hub flanges 7 and the cannula ends of the hubs drop into channel 83. At the end of channel 83, the projecting end 85 of the hub feed tube 27 holds back the cannula end of the hub, tipping it to a base-first position. Hub orienting unit 26 preferably has a transparent plastic cover 86, which may be pivoted around the pin 84, to observe orientation of the hubs and to relieve any jam-ups which may occur.

As shown in FIGURE 22, two hubs 3a and 3b faced in the same direction may nest together. If they are not separated by rise 79, the cover 86 contacts the hub flange 7, holding back hub 3b until the two hubs are separated.

At the lower end, the hub feed tube 27 curves downwardly to form a vertical guide tube 155 (FIGURES 6 and 9). The top of guide tube 155, which may be considered as the outer surface of the curved tube section located between feed tube 27 and guide tube 155, is cut away to provide open ends on feed tube 27 and on guide tube 155. A hub feed rod 151 moves axially through the guide tube 155 and out the open top of the guide tube toward the hub attaching station 150. The upper end of feed rod 151 has a hub receiving tip 152 of reduced diameter, adapted to receive a hub with its cannula end up. A leaf spring 87 is attached to the outside of tube 155 passing upwardly along it, curving inwardly over its top, and terminating in a tip 87a. The tip 87a normally rests in the end of the tube 27 holding back the flow of hubs through said tube.

When the column of hubs in feed tube 27 extends in front of photoswitch 88 (FIGURES 21 and 23), light passing from the incandescent bulb 89 through the passage 90 is interrupted. Interruption of this light beam deenergizes the electromagnet 91 allowing spring 93 to force hub stop 92 down to the position shown by the dotted lines in FIGURE 21. When the column of hubs drops below the photoswitch 88, light again passes from the incandescent bulb 89 through the light passage 90 to the photoswitch 88, energizing the electromagnet 91 and lifting the hub stop 92. The sensitivity of photoswitch 88 may be adjusted so that it will not be activated by the rapid passage of hubs down tube 27.

DETAILS OF CANNULA FEEDING MECHANISM

As shown in FIGURES 27 to 29, oriented cannulas are placed in cannula hopper 14 with the points 9 facing out. The hopper 14 is preferably made of brass or other non-magnetic material and slants back so that the base of each cannula rests against the back of the hopper. At the bottom of hopper 14, the sides 101 narrow inwardly toward the brass rotor 102. The rotor 102 is driven by a flexible cable 103 which is attached to spur gear 104 by a setscrew 106 (FIGURE 11). Cable 103 is held in place by bracket 100 (FIGURE 3) so that driving gear 105 meshes with spur gear 104. Driving gear 105 is bolted to table 10 so that the rotor 102 delivers a cannula to each cannula holder 121 as it pauses at cannula feeding station 119.

The upper end of flexible cable 103 terminates in a drive rod 107 which is connected to rotor 102 by yieldable joint 108. Joint 108 has an enlarged disc 109 integral with the rotor, a spring loaded spherical detent 110, and a rounded keyway 111. Keyway 111 has a ridge 112 so that detent 110 snaps into place when disc 109 is pushed in. If for any reason, rotor 102 jams, detent 110 is forced out of keyway 111 so that rotor 102 does not turn. Moreover, the rotor may be disengaged by pulling disc 109 out so as to disengage detent 110 from keyway 111.

Rotor 102 has two cannula grooves 114 and 115 located on opposite sides of its periphery and moves in a clockwise direction. As the groove 114 passes under cannula hopper 14, a single cannula drops into the groove (FIGURE 29). Rotor 102 pauses at a position intermediate between hopper 14 and cannula feeding tube 116. The exact position in which groove 114 pauses may be adjusted by loosening setscrew 106 and changing the position of gear 104 with relation to flexible cable 103. For faster speeds of the machine, it is desirable to have cannula groove 114 pause in a position close to feeding tube 116. When a groove 114 or 115 passes feeding tube 116, the cannula drops through the open top 117 into tube 116 which carries it to the assembly table.

The lower end of tube 116 is held directly over the center of cannla holder 121 by bracket 96 (FIGURE 3). The ends of collet opening bar 135 are cut away to form open areas 118 (FIGURE 11) over the center of the cannula holders. Tube 116 is made of nylon, stainless steel or other nonmagnetic material having a smooth, slick surface. The lower end of tube 116 terminates in a brass nipple 97 having an extension 98 on one side.

The cannula grooves 114, 115 in rotor 102 are preferably rectangular in shape. Each groove should be slightly deeper than the cannula diameter and about five thousandths inch more in width than in depth. The trailing edges of grooves 114, 115 are cut away to form a flattened surface 120, at a height of about two thirds of the cannula diameter from the bottom of the groove. This feature greatly reduces damage to the cannula and substantially eliminates jamming.

Rotor 102 is provided with annular grooves 113 and 113a at each end of grooves 114 and 115. Annular groove 113 prevents rotor 102 from touching and possibly damaging the points of the cannulas. Groove 113a prevents the rotor from touching the base of the cannula and possibly getting oil or grease on it.

To allow proper operation of the assembly table stations, the cannulas must reach the cannula holders 121 at a consistent time in the cycle. We have found that the cannulas are highly magnetic and that the attraction of cannulas for nearby metal parts is an important cause of inconsistencies in the feeding mechanism. We have therefore made the hopper 14, the rotor 102, and the tube 116 of brass or other nonmagnetic materials. The action of rotor 102 in turning the cannulas in hopper 14 and also the action of flattened surface 120 in moving the cannulas up and down prevents the cannulas from bridging across the hopper between the slanted sides 101.

DETAILS OF THE AIR SUPPLY SYSTEM

Drive cylinder 13, adhesive pumps 18, 21, hub assembly cylinder 153, and collet opening cylinder 136 are driven in both directions by air pressure. This air pressure is supplied to the cylinders by control valves (not shown) such as the No. 400A model made by the Mead Specialties Company, Chicago, Illinois. In this valve, a piston moves to one side of the valve when the air pressure on that side of the valve is reduced. A stemmed shuttle attached to the piston moves with it, opening one port and closing another. The air pressure is reduced on one side of the piston by lever arm 32 striking the limit valves 181, 182, and 183 (FIGURE 18) and releasing some of the pressure therein. For example, release of air pressure by the valve 181 causes a control valve to supply compressed air to inlet 34 of the drive cylinder 13 thus retracting the driving rod 31 and advancing the assembly table 10.

Release of pressure by the limit valve 182 actuates a second control valve causing it to supply air to the inlet 61 to retract the pistons of adhesive pumps 18, 21.

Release of pressure by limit valve 183 actuates a third control valve which supplies air through the inlet 158 of hub assembly cylinder 153, retracting the feed roll 151 downwardly. Simultaneously, the third control valve supplies air to an inlet (not shown) at the bottom of collet opening cylinder 136, forcing the opening bar 135 up and closing the collets at the cannula feeding station 119 and at the exit station 160. It should be noted that limit valve 183 is opened by contact with the tip of lever arm 32 before valves 181 and 182 are opened. On the return stroke the lever arm 32 again strikes limit valve 183. Since the air pressure in this line is already reduced however, there is no change in the position of the control valve piston.

When lever arm 32 is drawn by rod 31 to the position shown by the dotted lines in FIGURE 18, arm 32 simultaneously opens limit valves 186, 187, and 188, releasing air pressure. Release of pressure by valve 186 again trips the first control valve, this time causing it to supply air to inlet 35 of cylinder 13, extending rod 31, arm 32, and pawl 36 into position for the next cycle. Likewise release of pressure by limit valve 187 causes the second control valve to supply air to inlet 60 to advance the pistons of pumps 18, 21. Release of pressure by limit valve 188 causes air to be supplied to opening 154 of hub assembly cylinder 153 and to an opening (not shown) at the top of collet cylinder 136. Thus the hub feed rod 151 is extended upwardly to the position shown by the dotted lines in FIGURE 9, and the collet opening bar 135 is forced down, opening the collets.

DETAILS OF THE ASSEMBLY TABLE

Cannula feeding station

Figure 13:
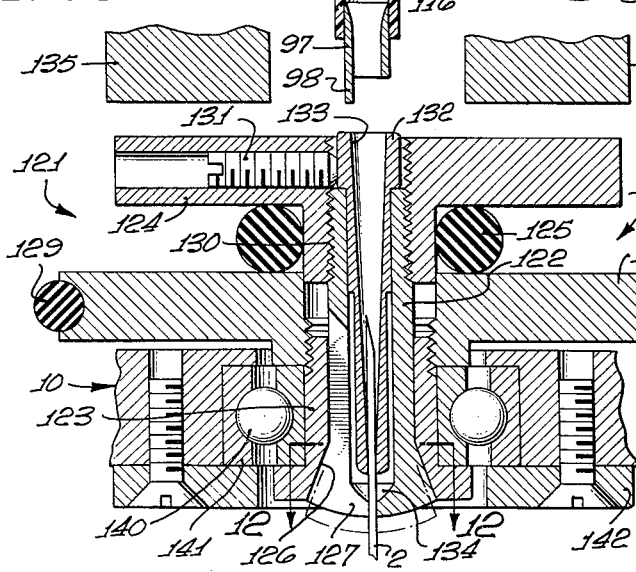
FIGURE 13 is a sectional view on the line 13—13 of FIGURE 11 showing details of the cannula holder and collet structure.
Figure 12:
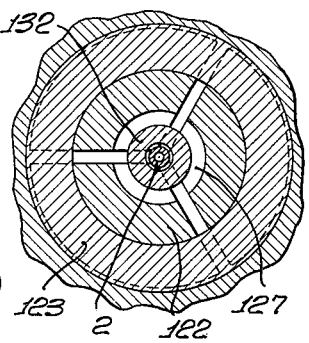
FIGURE 12 is a sectional view on the line 12—12 of FIGURE 13 showing details of the collet structure.

The cannula holder 121 at the first station 119 (FIGURES 11–13) has a hardened steel collet 122, a collet holder 123, a collet pad 124, and a resilient compression ring 125. The collet holder 123 has a tapered lower face 126 adapted to wedge against a corresponding face of collet 122 so as to close the jaws 127 of the collet tightly around a cannula 2. A spinner disc 128 having a resilient circumferential friction ring 129 is threaded onto the upper end of the collet holder 123. A brass sleeve 132, having a tapered bore 133, is wedged in the collet 122. At its lower end, the diameter of bore 133 is approximately 0.005 inch larger than the outside diameter of cannula 2. The jaws 127 are cut away in front of the brass sleeve 132 to form a frusto-conical lead-in space 134. The collet pad 124 is attached to the upper part of collet 122 by the threads 130 and is held in place by a setscrew 131.

Collet cylinder 136 drives the collet opening bar 135 down against the collet pad 124, opening collet 122. As the pad 124 moves down against the compression ring 125, collet 122 moves to the position shown by dotted lines in FIGURE 13 (approximately thirty thousandths of an inch below the position shown by the solid lines). This allows the tapered face of the collet to expand against the tapered face 126 of the collet holder 123, opening the jaws 127. At this point in the cycle, a cannula 2 is dropped through feeding tube 116, through the brass sleeve 132 and comes to rest with its base on the magnetized bar 138 (FIGURE 3). This bar is adjusted by means of setscrew 137 for various length cannulas or for regulating the position on the cannula to which adhesive is to be applied at the next station.

Collet opening bar 135 is then raised, releasing pressure on pad 124. Compression ring 125 then expands, forcing the pad 124 and the collet 122 upwardly. As collet 122 moves up, the tapered lower face is wedged inwardly by the corresponding face 126 of collet holder 123, closing jaws 127 around cannula 2. The table then advances, moving cannula holder 121 to the second station.

When cannulas of a different diameter are to be used, the setscrew 131 is loosened, the collet pad 124 unscrewed from the collet 122, and the collet with its brass sleeve 132 dropped out of collet holder 123. A new collet may then be inserted in collet holder 123, the collet pad 124 screwed onto the collet thread 130 and the setscrew 131 retightened.

At subsequent stations it is desirable to rotate the cannula holder. The holder 121 therefore has ball bearings 140 mounted in a raceway 141 which is held in assembly table 10 by the holding pad 142.

Extra station

In the illustrated example of the invention the second station, generally indicated as 143, is an extra station provided for additional operations. After a pause at this station, the table 10 advances the cannula holder 121 to the third station.

Adhesive applying station

When the assembly table 10 moves forward to place cannula holder 121 at the third station 145 (FIGURES 6 and 7), the collet spinning bar 146 driven by motor 147, contacts friction ring 129, rotating cannula holder 121 on the ball bearings 140. The cannula 2 then contacts a drop of adhesive on the tip 76 of adhesive mixing chamber 68. The position of the applicator tip may be adjusted by knob 94 of the adjustable platform 95. After a thin band of adhesive has been applied completely around the cannula base, cannula holder 121 is moved to the fourth station.

Hub attaching station

At the hub attaching station, generally indicated as 150, cannula holder 121 is rotated by spinning bar 156 driven by motor 157. As shown in FIGURES 6 and 9, a column of hubs in the tube 27 is held back by the leaf spring 87. On the downward stroke of the hub feed rod 151 a single hub is allowed to drop into the top of guide tube 155 and comes to rest on the hub receiving tip 152 of said rod. The feed rod 151 is then urged upwardly to the position shown by the dotted lines in FIGURE 9, by air entering the hub assembly cylinder 153 through the bottom inlet 154. The inlet 154 has an air flow regulator and a shutoff valve (not shown) so that the speed at which rod 151 moves upwardly can be adjusted, or this operation can be shut off completely while other parts of the machine are being checked. The upward limit of the hub feed rod 151 is controlled by the adjustable set nut 159 and the rod 151 is centered by the guide tube 155. As the hub 3 is forced onto cannula 2, the annular flange 5 of the hub wipes the base of the cannula clean and retains the adhesive 6 in the space above flange 5. Rotation of cannula 2 effectively spreads the adhesive 6.

Air is then admitted to the upper air inlet 158 of hub assembly cylinder 153, driving feed rod 151 down. As feed rod 151 moves down, the end 87a of leaf spring 87 follows along the surface of the feed rod. If for any reason, such as a missing cannula, a hub remains on the tip 152, the spring 87 will strip it off into a bin 149. As the feed rod 151 moves further down, a single hub drops from the feed tube 27 onto the hub receiving tip 152. The tip 87a of spring 87 then moves into the end of tube 27 to hold the remaining hubs in place as shown in FIGURE 9.

Exit station

At the last station, generally indicated as 160, collet opening bar 135 presses the collet pad 124 down against compression ring 125. This downward motion opens collet jaws 127, releasing cannula 2. The assembled needle 1 falls, hub first, through the wire ring 161 onto the wire grating 162 (FIGURES 11 and 19). Any cannulas which have not received hubs pass through grating 162 and are rejected. The assembled needles slide from grating 162 down the ramp 163 onto conveyor 164 which carries them through the curing oven 29. Oven 29 has a heating element 166, a thermometer 167 and a thermoswitch 168. The driving axle 170 of conveyor 164 is connected by chain 171 to the variable speed drive 172 of motor 173. The heat of the oven causes the adhesive mixture to flow uniformly around the cannula, and then to cure into a permanent resilient material. After curing, the assembled needles slide hub first down the ramp 174 to a container (not shown) resting on the platform 175.

After leaving exit station 160, the empty cannula holder 121 advances to the first or cannula feeding station 119. Between these two stations there is provided an alarm bell 191 (FIGURE 3) supported by the arm 192. A wire probe 193 extends inwardly from a point near the bell 191, passing beyond and below the path of cannula holder 121. In this manner, a cannula or needle which is not released at exit station 160 pulls the probe 193 to one side and then releases it. When probe 193 is released, wire coil 194 strikes the bell 191 warning the operator of the trouble before another cannula is delivered through the tube 116.

Having fully described our invention, it is to be understood that we do not wish to be limited to the details herein set forth, but our invention is of the full scope of the appended claims.

We claim:

1. A machine for assembling hypodermic needles including a hub and a cannula comprising: a rotary table including cannula holders; intermittent means for rotating said table and successively positioning said holders at predetermined stations; means associated with said table at an initial station for delivering a single cannula to said station; dispensing means associated with said table at a following station for applying adhesive to a portion of said cannula; hub attaching means associated with said table at a further station for placing hubs on said cannulas; and a final exit station on said table.

2. A machine as set forth in claim 1 wherein the cannula holders are rotatable and the adhesive dispensing and the hub attaching stations are provided with driving means for rotating said holders.

3. A machine as set forth in claim 1 wherein the hub attaching means is associated with a means for orienting hubs to a base down position and a means for feeding the oriented hubs to said attaching means.

4. A machine as set forth in claim 1 wherein the cannula feeding means leads into an opening passing through the cannula holder and a magnetized stop is located below said opening.

5. A machine as set forth in claim 1 wherein a conveyor means is associated with the exit station, said conveyor means passing through a curing oven; and an alarm means is provided between the exit station and the initial station whereby an alarm is sounded if a cannula remains in the cannula holder beyond said exit station.

6. A machine as set forth in claim 1 wherein the adhesive dispensing means includes a disposable plastic member having a mixing chamber, a flattened applicator nozzle, and inlets for polyamide and epoxy ingredients.

7. A machine as set forth in claim 6 wherein supply tubes connect the polyamide inlet and the epoxy inlet to the polyamide and epoxy pumps; a metering valve and a check valve on each of said supply tubes and a heating unit on the polyamide reservoir.

8. A machine as set forth in claim 1 wherein the cannula holder has a collet; a collet holder, and a collet pad; a thick rubber ring beneath said pad urging the pad and collet upwardly; and a tapered surface on said collet holder adapted to close the collet when said collet is in its upward position.

9. A machine as set forth in claim 8 wherein the collet has an inner brass sleeve having a tapered bore; jaws at the lower end of said collet; and a tapered lead-in section between the lower end of said sleeve and the collet jaws.

10. A machine as set forth in claim 1 wherein the means for delivering a cannula to the initial station is driven by the table rotating means, coordinated therewith, and includes a rotor; a longitudinal cannula receiving grooove on the surface of said rotor; a cannula bin above said rotor and a plastic tube leading from the rotor to the initial station of the rotary table.

11. A machine as set forth in claim 10 wherein the cannula receiving groove pauses between the cannula bin and the cannula feeding tube between the intermittent movements of the table rotating means, the position during said pause being adjustable to increase or decrease the distance of said position from the feeding tube.

12. A machine as set forth in claim 10 wherein a yieldable joint is provided between the table rotating means and the rotor.

13. A machine as set forth in claim 10 wherein the surface of the rotor rearwardly of the cannula slot is flattened to approximately one third the depth of said slot.

14. A machine for assembling hypodermic needles including a cannula and a hub having a guide flange at its base comprising: a rotary table including cannula holders; intermittent means for rotating said table and successively positioning said holders at predetermined stations; supply means associated with said table at an initial station for delivering a single cannula in a base down position to said station; dispensing means associated with said table at a following station for applying adhesive to the base of said cannulas; hub attaching means associated with said table at a further station for placing hubs on said cannulas; hub feeding means associated with said attaching means and including a vibratory feeder, an orientation track adapted to engage the hubs by the guide flange while allowing the other end of the hub to drop into a channel, a downwardly slanted hub feed tube, a hub tipping means at the entrance to said feed tube, photoswitch means adapted to cut off the supply of hubs to the feed tube when a predetermined level is reached, and a hub metering means adapted to supply one hub at a time to said hub attaching means.

15. A machine for assembling hypodermic needles comprising: a movable carrier; a plurality of cannula holders on said carrier; intermittent means for advancing the carrier and for successively positioning the cannula holders at predetermined stations; means for delivering a single cannula to one of said holders positioned at an initial station; dispensing means for applying adhesive to a portion of each cannula at a subsequent station, hub attaching means for placing a hub on each cannula at further station; and means for removing the assembled needles at an exit station.

16. A machine for assembling hypodermic needles as set forth in claim 15 wherein the movable carrier is a rotary table; a ratchet wheel associated with said table; notches on said ratchet wheel; a reciprocating lever arm; a driving pawl associated with the lever arm; a locking arm having on one end a lug to lock the ratchet wheel; a stud on the end of the locking arm opposite the lug; a trip arm pivotally mounted on the lever arm; means forcing the trip arm against the locking arm stud so as to unlock the ratchet wheel on the forward stroke of the lever arm; means urging the driving pawl into a ratchet wheel notch on said forward stroke; means urging the lug to lock the ratchet wheel at the end of the lever arm stroke; and means on the trip arm for guiding said arm around the locking arm stud so that the lug does not unlock the ratchet wheel during the return stroke of the lever arm.

17. A machine for assembling hypodermic needles as set forth in claim 15 wherein the movable carrier is a rotary table; a rachet wheel attached to said table; notches on the ratchet wheel; a reciprocating lever arm; a driving pawl below and pivotally attached to the lever arm; a locking arm having on one end a lug adapted to fit in a ratchet wheel notch so as to lock said ratchet wheel; a stud on the end of the locking arm opposite the lug; a trip arm pivotally mounted on the lever arm; means forcing the trip arm against the locking arm stud so as to remove the lug from the ratchet wheel notch on the forward stroke of the lever arm; means urging the driving pawl into the next succeeding ratchet wheel notch on said forward stroke; means urging the lug into said succeeding notch at the end of the lever arm stroke; and cam means on the trip arm for guiding said arm around the locking arm stud so that the lug is not removed from the notch during the return stroke of the lever arm.

18. In a machine for assembling hypodermic needles as set forth in claim 15, an adhesive mixing system comprising: a generally cylindrical mixing chamber; pumping means for supplying adhesive ingredients to said mixing chamber; a rotor in the mixing chamber; a relatively small space between the rotor and the inner wall of the mixing chamber, whereby the adhesive ingredients are mixed in thin layers by a smearing action; and an applicator tip leading from the mixing chamber.

19. In a machine for assembling hypodermic needles as set forth in claim 15, an adhesive mixing system comprising: a generally cylindrical plastic mixing chamber having a frusto conical end; pumping means for supplying adhesive ingredients to said mixing chamber; a generally cylindrical rotor in the mixing chamber having a conical tip; a spiral groove on the rotor; a space 0.010 to 0.030 inch thick between the rotor and the inner wall of the mixing chamber, whereby the adhesive ingredients supplied to the chamber are mixed in thin layers by a smearing action; and an applicator tip extending from the frusto conical section.

20. In a machine for assembling hypodermic needles, an adhesive mixing system as set forth in claim 19 wherein the pumping means supplies at least 20 percent more adhesive ingredients to the mixing chamber than will be used in the needles.

21. A machine for assembling hypodermic needles as set forth in claim 3 wherein the hub attaching means comprises: a downwardly slanting hub feed tube; an opening in said tube below the hub attaching station of the assembly table; a vertical guide tube axially aligned with the hub attaching station; an opening in the top of the guide tube; a hub feed rod passing axially through said guide tube; a hub receiving tip on said feed rod; means for metering hubs one at a time from the feed tube onto the hub receiving tip; means for driving the feed rod upwardly through the guide tube opening so as to force a hub carried by the receiving tip onto a cannula at the hub attaching station; means for returning said feed rod to its original position; and means for stripping a hub from the indexing tip during the return stroke.

References Cited in the file of this patent

UNITED STATES PATENTS

| | | |
|---|---|---|
| 2,069,386 | Palucki | Feb. 2, 1937 |
| 2,169,063 | Wensley, et al. | Aug. 8, 1939 |
| 2,427,712 | Casler et al. | Sept. 23, 1947 |
| 2,455,945 | North et al. | Dec. 14, 1948 |
| 3,546,810 | Anderson | Mar. 27, 1951 |
| 2,603,461 | Marienthal | July 15, 1952 |
| 2,822,911 | Kummer et al. | Feb. 11, 1958 |